Dec. 4, 1962 W. C. DABROSKI 3,067,057
PRESSURE SENSITIVE ADHESIVE TAPE HAVING RELEASE COATING OF
COMPOSITION OF ALDEHYDE OR IMIDE RESIN, SULPHATED OR
SULPHONATED WETTING AGENT, AND REACTION PRODUCT OF
MONOENE OR DIENE MONOMERS AND CARBOXYLIC ACID
Filed Oct. 26, 1959

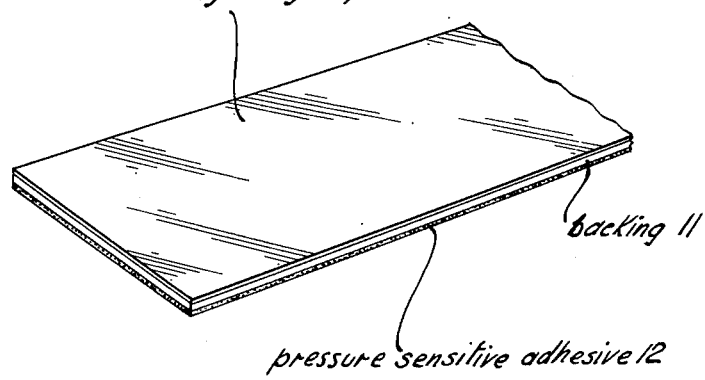

13 is an aqueous mixture of an aldehyde or imide resin, a $C_{11}-_{21}$ straight chain aliphatic sulphated or sulfonated wetting agent, and a polymeric reaction product of monoene or diene monomers and a monomeric polymerizable carboxylic acid with a double bond $\alpha, \beta$ to the carboxylic group.

backing 11 pressure sensitive adhesive 12

INVENTOR
WINIFRED CHRISTINA DABROSKI
BY
Albert T. St Clair
ATTORNEY

3,067,057
PRESSURE SENSITIVE ADHESIVE TAPE HAVING RELEASE COATING OF COMPOSITION OF ALDEHYDE OR IMIDE RESIN, SULPHATED OR SULPHONATED WETTING AGENT, AND REACTION PRODUCT OF MONOENE OR DIENE MONOMERS AND CARBOXYLIC ACID

Winifred Christina Dabroski, East Brunswick, N.J., assignor to Johnson & Johnson, a corporation of New Jersey
Filed Oct. 26, 1959, Ser. No. 848,560
9 Claims. (Cl. 117—68.5)

This invention relates to the art of release coatings, and more particularly to a release coating containing a mixture of a water-dispersible, heat-reactive aldehyde or imide resin, an emulsifying agent comprising a sulfated or sulfonated wetting agent, and an oil-resistant film-forming polymer derived from a polymeric reaction product of one or more monoene or diene monomers and a monomeric, polymerizable carboxylic acid or anhydride, with a double bond $\alpha$, $\beta$ to the carboxylic group. It also relates to pressure-sensitive adhesive tapes having such release coatings, and the method of making such pressure-sensitive adhesive tapes.

The term "backing," as used herein, means any suitable material for supporting a pressure-sensitive adhesive.

The term "pressure-sensitive adhesive," as used herein, means an elastomeric material, such as a natural or synthetic rubber, with or without a resinous component, which provides a normally aggressively tacky pressure-sensitive adhesive that can be applied with light finger pressure in the absence of heat and solvent.

The term "release coating," as used herein, means a thin coating applied to the opposite side of the backing from the side which carries the pressure-sensitive adhesive, or to a liner, to permit easy unwinding after being rolled or stacked with the release material in contact with the pressure-sensitive adhesive of a super-imposed layer of tape or a label.

Pressure-sensitive tapes are usually wound in rolls, thus bringing the backing in one layer into contact with the pressure-sensitive adhesive coating on the layer thereabove. This has a tendency to cause the upper layer to adhere to the next lower layer, making it difficult to unwind the tape because of the aggressively tacky character of the pressure-sensitive adhesive.

Release coatings are therefore usually applied to the backing of pressure-sensitive tapes in order to permit easy unwinding of the tape, without detackifying the pressure-sensitive adhesive coating or splitting the backing.

Numerous attempts have been made to overcome these disadvantages, but many prior release coatings have been objectionable for various reasons. One very important reason is that after aging, especially at elevated temperatures, many release coatings lose their release properties. In other words, the release feature is fugitive. Examples of such release agents are paraffin wax coatings or emulsions.

Another objectionable feature in some prior art release coatings is that they lose their adhesiveness to the backing material and become detached therefrom, becoming attached to the pressure-sensitive side of the tape, and thereby lessening its adhesive characteristics, usually referred to as "detackification."

A further objection to some prior release coatings is inadequate heat stability and solvent resistance.

Most release agents do not print and it is usually difficult to unwind most of those that will print because the ink has blocked the action of the release agent. This is particularly true where the printing covers a major part of the surface of the backing. By the present invention, this difficulty is avoided, apparently because the release agent migrates through the ink and still gives release.

I have discovered that these and other disadvantages of prior art release coatings can be overcome, and pressure-sensitive adhesive tape obtained which will have good release characteristics and will not lose its release properties on aging, and to which ink will adhere, by applying to the opposite side of the backing a thin coating of a mixture of a water-dispersible, heat-reactive aldehyde or imide resin, an emulsifying agent comprising a sulfated or sulfonated wetting agent containing at least one aliphatic straight chain of 11–21 carbon atoms, and an oil-resistant, film-forming polymer derived from a polymeric reaction product of one or more monoene and/or diene monomers and a monomeric polymerizable carboxylic acid or anhydride, with a double bond $\alpha$, $\beta$ to the carboxylic group.

It is therefore an object of this invention to provide a new and useful class of release coatings.

It is another object to provide pressure-sensitive tapes containing a normally aggressively tacky pressure-sensitive adhesive on one side and a thin release coating on the opposite side, which will permit easy unwinding of the tape and not detackify the pressure-sensitive adhesive, nor be offset from the backing to the pressure-sensitive adhesive immediately thereabove.

It is also an object to provide a release coating which will have good ink adherence.

It is a further object to provide a method of making pressure-sensitive adhesive tapes which maintain effective release characteristics on aging for long periods of time, and to which ink will continue to anchor, even though subjected to elevated temperatures.

It is another object to eliminate multiple backsize or release coatings.

With the above and other objects in view, which will be apparent as the description proceeds, I have set forth my invention in the following specification and have illustrated certain embodiments thereof in the following examples, and the accompanying drawing but it will be understood that this disclosure is merely for the purpose of illustrating practical embodiments of the invention, and the latter is not to be limited thereto.

SATURATED BACKINGS

Any of the conventional backings for pressure-senstive tape can be used with this invention. One of the most widely used backings is kraft paper, such as 27-pound or 30-pound crepe paper. Another widely used type of paper is made from rope or hemp. A typical example is Flexrope, which is a rope paper supplied by the J. A. Manning Co. Suitable film backings are cellulose acetate, cellophane, cellulose acetate-butyrate, cellulose propionate, vinyl chloride or polyethylene terephthalate.

Paper backings are generally saturated with a rubber compound to give strength and improve the delamination resistance. These saturants may vary widely, but suitable examples are as follows:

*Saturated Backing 1*

30# kraft crepe paper was saturated with an amount (dry weight) of the following saturant equal to 90% of the weight of the unsaturated kraft, and cured at 380° F. for 1 minute.

| | Parts by weight of total solids |
|---|---|
| Copolymer of butadiene-acrylonitrile (67:33) (40% solids) | 70.0 |
| Copolymer of butadiene-styrene (50:50) (40% solids) | 17.5 |
| Copolymer of butadiene-styrene (15:85) (42% solids) | 10.0 |
| Water-dispersible, heat-reactive phenol-formaldehyde resin (65% solids) | 2.0 |
| Tetra sodium salt of ethylene-diamine tetra acetic acid (30% solids) | .5 |
| Water to desired solids. | |
| | 100.0 |

*Saturated Backing 2*

4 mils Flexrope was saturated with an amount (dry weight) of the following saturant equal to 85% of the weight of the unsaturated Flexrope.

| | Parts by weight of total solids |
|---|---|
| Copolymer of butadiene-acrylonitrile (67:33) (40% solids) | 55.0 |
| Copolymer of butadiene-stryene (50:50) (40% solids) | 25.0 |
| Copolymer of butadiene-stryene (15:85) (42% solids) | 19.5 |
| Tetra sodium salt of ethylene-diamine tetra acetic acid (30% solids) | .5 |
| Water to desired solids. | |
| | 100.0 |

*Saturated Backing 3*

4 mils Flexrope was saturated with an amount (dry weight) of the following saturant equal to 85% of the weight of the unsaturated Flexrope.

| | Parts by weight of total solids |
|---|---|
| Copolymer of butadiene-acrylonitrile (67:33) (40% solids) | 61.0 |
| Copolymer of butadiene-styrene (50:50) (40% solids) | 26.0 |
| Titanium dioxide dispersion (59% solids) | 13.0 |
| Tetra sodium salt of ethylene-diamine tetra acetic acid (30% solids) | .4 |
| Aminox (antioxidant) (diphenylamine acetone reaction product) (Naugatuck Chemical Co.) | .06 |
| Water to desired solids. | |
| | 100.46 |

*Saturated Backing 4*

4 mils Flexrope was saturated with an amount (dry weight) of the following saturant equal to 85% of the weight of the unsaturated Flexrope.

| | Parts by weight of total solids |
|---|---|
| Copolymer of butadiene-acrylonitrile (67:33) (40% solids) | 43.0 |
| Copolymer of butadiene-styrene (50:50) (38.5% solids) | 18.0 |
| Titanium dioxide dispersion (59% solids) | 6.0 |
| Tetra sodium salt of ethylene-diamine tetra acetic acid (30% solids) | .3 |
| Aminox (antioxidant) (diphenylamine acetone reaction product) (Naugatuck Chemical Co.) | .005 |
| Water to desired solids. | |
| | 67.305 |

ADHESIVE

A large variety of adhesive masses may be used to impart the aggressively tacky adhesive properties. Examples of suitable adhesive masses are as follows:

*Adhesive A*

| | Parts by weight |
|---|---|
| Copolymer of butadiene-styrene (77:23) | 31 |
| Crude rubber | 43 |
| Pure gum reclaim (76% rubber hydrocarbons) | 12 |
| Zinc oxide | 50 |
| 2,5-ditertiary amyl hydroquinone | 1 |
| 2,6-ditertiary butyl 4-methyl phenol | 1 |
| Phenolated polyterpene resin (14% phenol) | 57 |
| Tetra ethylene pentamine | 1 |
| Triphenyl phosphite | 5 |
| | 201 |

*Adhesive B*

| | |
|---|---|
| Copolymer of butadiene-styrene (77:23) | 31 |
| Crude rubber | 43 |
| Pure gum reclaim (76% rubber hydrocarbons) | 12 |
| Zinc oxide | 50 |
| 2,5-ditertiary amyl hydroquinone | 1 |
| 2,6-ditertiary butyl 4-methyl phenol | 1 |
| Pure polyterpene hydrocarbon resin (M.P. 70° C.) | 57 |
| Triphenyl phosphite | 7 |
| Hydrocarbons of high molecular weight derived entirely from selected crude petroleum | 6 |
| Lecithin | .5 |
| | 208.5 |

*Adhesive C*

| | |
|---|---|
| Crude rubber | 60 |
| Aluminum hydrate | 21.5 |
| Titanium dioxide | 7 |
| Pure polyterpene hydrocarbon resin (M.P. 115° C.) | 50 |
| M-tolylene diisocyanate | 1 |
| 2,5-ditertiary amyl hydroquinone | 1 |
| 2,6-ditertiary butyl 4-methyl phenol | 1 |
| Lecithin | 4 |
| Tetra sodium salt of ethylene-diamine tetra acetic acid | 1 |
| | 146.5 |

*Adhesive D*

| | |
|---|---|
| Copolymer of butadiene-styrene (77:23) | 33 |
| Crude rubber | 33 |
| Zinc oxide | 36 |
| 2,5-ditertiary amyl hydroquinone | 1.5 |
| 2,6-ditertiary butyl 4-methyl phenol | 1.5 |
| Heat-hardening p-octyl phenol-formaldehyde resin (M.P. 90° C.) | 13 |
| Diethylene glycol ester of disproportionated rosin | 71 |
| Tetra sodium salt of ethylene-diamine tetra acetic acid | 1 |
| | 190.0 |

*Adhesive E*

| | |
|---|---|
| Crude rubber | 71 |
| Aluminum hydrate | 34 |
| Pure polyterpene hydrocarbon resin (M.P. 115° C.) | 33.5 |
| 2,5-ditertiary amyl hydroquinone | 1.8 |
| Nonreactive octyl phenol-formaldehyde resin (M.P. 90° C.) | 8 |
| Triphenyl phosphite | 3.5 |
| Lecithin | 4.5 |
| | 156.3 |

Adhesive F

| | Parts by weight |
|---|---|
| Copolymer of butadiene-styrene (77:23) | 12 |
| Crude rubber | 48 |
| Aluminum hydrate | 28 |
| Pure polyterpene hydrocarbon resin (M.P. 115° C.) | 48 |
| 2,5-ditertiary amyl hydroquinone | 1.2 |
| 2,6-ditertiary butyl 4-methyl phenol | 1.2 |
| Nonreactive octyl phenol-formaldehyde (M.P. 90° C.) | 6 |
| Tetra sodium salt of ethylene-diamine tetra acetic acid | 1 |
| | 145.4 |

Adhesive G

| | |
|---|---|
| Copolymer of butadiene-styrene (77:23) | 8 |
| Crude rubber | 58 |
| Aluminum hydrate | 33 |
| Pure polyterpene hydrocarbon resin (M.P. 115° C.) | 53 |
| Nonreactive rosin modified phenol-formaldehyde resin (Amberol M–88, made by Rohm & Haas) (M.P. 145–155° C.) | 7 |
| M-tolylene diisocyanate | 2 |
| 2,5-ditertiary amyl hydroquinone | 1.2 |
| 2,6-ditertiary butyl 4-methyl phenol | 1.2 |
| | 163.4 |

Adhesive H

| | |
|---|---|
| Crude rubber | 60 |
| Aluminum hydrate | 16.5 |
| Titanium dioxide | 12 |
| Pure polyterpene hydrocarbon resin (M.P. 115° C.) | 43 |
| 2,5-ditertiary amyl hydroquinone | 1.5 |
| Nonreactive rosin modified phenol-formaldehyde resin (Amberol M–88) (M.P. 145–155° C.) | 7 |
| Triphenyl phosphite | 3 |
| Lecithin | 4 |
| | 147.0 |

Adhesive J

| | |
|---|---|
| Crude rubber | 50.0 |
| Zinc oxide | 29.0 |
| Pure polyterpene hydrocarbon resin (M.P. 115° C.) | 49.0 |
| M-tolylene diisocyanate | 2.5 |
| Pure polyterpene hydrocarbon resin (M.P. 70° C.) | 15.0 |
| Butyl phenol-formaldehyde resin (M.P. 121–138° C.) | 3.0 |
| 2,5-ditertiary amyl hydroquinone | 1.0 |
| Tetra sodium salt of ethylene-diamine tetra acetic acid | 4.25 |
| 2,6-ditertiary butyl paracresol | 1.5 |
| Lecithin | 2.0 |
| | 157.25 |

RELEASE BACKSIZE

In accordance with my invention a suitable release backsize coating is applied to the opposite side of the backing from that which carries the adhesive mass in order to form a release coating.

Examples of suitable release coatings or backsizes are as follows:

Backsize I

| | Parts by wet weight |
|---|---|
| "Cypel" resin emulsion (40% solids) | 100 |
| Water-dispersible, heat-reactive phenol-formaldehyde resin (65% solids) | 10 |

The "Cypel" resin emulsion used in this and some of the other backsizes of this invention is a product sold under this trade name by the American Cyanamid Company, and is believed to be a mixture of approximately 100 parts of 63% ethyl acrylate, 35% acrylonitrile and 2% methacrylic acid, and
4.5 parts of Duponol C (sodium lauryl sulfate), (sold by E. I. du Pont de Nemours & Co.)

100 parts of "Cypel" resin emulsion (40% solids) are mixed with 10 parts of a water-dispersible, heat-reactive phenol-formaldehyde (65% solids).

EXAMPLE Ia

Backsize I is applied to saturated paper 1 at 0.3 oz./sq. yd. (dry weight), and cured at 300° F. for 1 minute. Adhesive A is applied to the opposite side at 2.5 oz./sq. yd. (dry weight).

EXAMPLE Ib

Backsize I is applied to saturated paper 1 at 0.3 oz./sq. yd. (dry weight), and cured at 300° F. for 1 minute. Adhesive B is coated on the opposite side at 2.35 oz./sq. yd. (dry weight).

EXAMPLE Ic

Backsize I is applied to saturated paper 1 at 0.3 oz./sq. yd. (dry weight), and cured at 300° F. for 1 minute. Adhesive C is coated on the opposite side at 2.25 oz./sq. yd. (dry weight).

EXAMPLE Id

Backsize I is applied to saturated paper 1 at 0.3 oz./sq. yd. (dry weight. Adhesive D is applied on the opposite side at 1.8 oz./sq. yd. (dry weight), and both the adhesive and backsize cured at 320° F. for 1 minute.

Release and tack results with the tapes of Examples Ia–Id made by test procedures 1 and A, respectively, are as follows:

| Example | Adhesion to Backing, oz. | Tack |
|---|---|---|
| Ia | 22 | .20 |
| Ib | 20 | .25 |
| Ic | 12 | .18 |
| Id | 16 | .20 |

The test procedure used for evaluating the release agents in Examples I to V, inclusive, and XI through XIII, is as follows:

RELEASE PROCEDURE 1

After aging the roll of coated tape for 7 days at room temperature, the adhesion of the tape to its own backing as it is unwound on a roll is measured by placing the roll of tape on a free-turning core-sized spindle and pulling the tape over a series of rolls at a constant speed of 150 feet per minute. The resistance of the roll of tape to this unwind force is measured in ounces and recorded on a chart in ounces per inch width.

TACK PROCEDURE A

This test is a measure of "quick-stick" or "instantaneous grab." A piece of tape, adhesive mass side up, is placed on the level portion of a channeled metal strip which has at one end a curved elevation based on a 12" radius. A 1" diameter clean steel ball is dropped from a measured height and rolls down the slope onto the tape. The distance the ball rolls before coming to a stop is recorded, and results are reported in height dropped divided by the distance travelled.

Backsize II

| | Parts by wet weight |
|---|---|
| "Cypel" resin emulsion (40% solids) | 100 |
| Water-dispersible, heat-reactive urea-formaldehyde resin (30% solids) | 3 |

100 parts of "Cypel" resin emulsion (40% solids) are mixed with 3 parts of a water-dispersible, heat-reactive urea-formaldehyde resin (30% solids).

EXAMPLE IIa

Backsize II is applied to saturated backing 3 at about .25 oz./sq. yd. (dry weight), and cured at 300° F. for 1 minute. Adhesive F is coated on the opposite side at 1.6 oz./sq. yd. (dry weight).

EXAMPLE IIb

Backsize II is applied to saturated backing 2 at about .25 oz./sq. yd. (dry weight), and cured at 300° F. for 1 minute. Adhesive E is coated on the opposite side at 1.6 oz./sq. yd. (dry weight).

EXAMPLE IIc

Backsize II is applied to saturated backing 4 at about .25 oz./sq. yd. (dry weight), and cured at 300° F. for 1 minute. Adhesive C is coated on the opposite side at 1.8 oz./sq. yd. (dry weight).

EXAMPLE IId

Backsize II is applied to saturated backing 3 at about .25 oz./sq. yd. (dry weight). Adhesive D is coated on the opposite side at 1.2 oz./sq. yd. (dry weight) and both the adhesive and backsize are cured at 320° F. for 1 minute.

EXAMPLE IIe

Backsize II is applied to saturated backing 3 at about .25 oz./sq. yd. (dry weight), and cured at 300° F. for 1 minute. Adhesive H is coated on the opposite side at 1.6 oz./sq. yd. (dry weight).

Release and tack results with the tapes of Examples IIa–IIe made by test procedures 1 and A, respectively, are as follows:

| Example | Adhesion to Backing, oz. | Tack |
| --- | --- | --- |
| IIa | 8 | .6 |
| IIb | 20 | 1.0 |
| IIc | 10 | .17 |
| IId | 8 | .27 |
| IIe | 4 | .36 |

Backsize III

|  | Parts by wet weight |
| --- | --- |
| "Cypel" resin emulsion (40% solids) | 100 |
| Water-dispersible, heat-reactive phenol-formaldehyde resin (65% solids) | 20 |

100 parts of "Cypel" resin emulsion (40% solids) are mixed with 20 parts of a water-dispersible, heat-reactive phenol-formaldehyde resin (65% solids).

EXAMPLE III

Backsize III is coated on saturated paper 1 at 0.3 oz./sq. yd. (dry weight), and cured at 300° F. for 1 minute. Adhesive C is coated on the opposite side at 2.25 oz./sq. yd. (dry weight).

Release and tack results with this tape, using adhesive C, made by test procedures 1 and A, respectively, are as follows:

Adhesion to backing _____ oz__ 22
Tack _____ .16

Backsize IV

|  | Parts by wet weight |
| --- | --- |
| "Cypel" resin emulsion (40% solids) | 100 |
| Water-dispersible, heat-reactive phenol-formaldehyde resin (65% solids) | 30 |

100 parts of "Cypel" resin emulsion (40% solids) are mixed with 30 parts of a water-dispersible, heat-reactive phenol-formaldehyde resin (65% solids).

EXAMPLE IV

Backsize IV is applied to saturated paper 1 at 0.3 oz./sq. yd. (dry weight), and cured at 300° F. for 1 minute. Adhesive G is coated on the opposite side at 2.25 oz./sq. yd. (dry weight).

Release and tack results with this tape, using adhesive G, made by test procedures 1 and A, respectively, are as follows:

Adhesion to backing _____ oz__ 36
Tack _____ .20

Backsize V

|  | Parts by wet weight |
| --- | --- |
| "Cypel" resin emulsion (40% solids) | 100 |
| Water-dispersible, heat-reactive urea-formaldehyde resin (30% solids) | 10 |

100 parts of "Cypel" resin emulsion (40% solids) are mixed with 10 parts of a water-dispersible, heat-reactive urea-formaldehyde resin (30% solids).

EXAMPLE V

Backsize V is coated on saturated paper 1 at 0.3 oz./sq. yd. (dry weight), and cured at 300° F. for 1 minute. Adhesive G is coated on the opposite side at 2.25 oz./sq. yd. (dry weight).

Release and tack results with this tape, using Adhesive G, made by test procedures 1 and A, respectively, are as follows:

Adhesion to backing _____ oz__ 22
Tack _____ .25

Backsize VI

|  | Parts by wet weight |
| --- | --- |
| Emulsion interpolymer of 63% ethyl acrylate, 35% acrylonitrile, 3% methacrylic acid emulsified with 4.5 parts of Duponol C (sodium lauryl sulfate) | 100 |
| Water-dispersible, heat-reactive phenol-formaldehyde resin (65% solids) | 10 |

PROCEDURE FOR PREPARATION OF THE EMULSION FOR EXAMPLES VI–VIII AND XIV 4.5 parts of Duponol C are added to 100 parts of ion exchanged water which contains 0.75 part of sodium bicarbonate. The mixture is placed in a reaction flask provided with stirrer, reflux condenser, thermometer, two addition funnels and a bubble tube for introducing nitrogen. Nitrogen is started bubbling through and the flask is heated to 86° C. A catalyst solution (0.7 part ammonium persulfate, 0.19 part sodium bicarbonate and 25 parts water) and a mixture of the 3 monomers (63 parts ethyl acrylate, 35 parts acrylonitrile and 3 parts methacrylic acid) is added dropwise at such a rate that all of the monomer solution and ⅘ of the catalyst solution are introduced within a period of 2½ hours. The remaining ⅕ of the catalyst solution is added within a further ½ hour period. Temperature is kept at 86° C. during the 3 hours reaction time. Steam distillation is then carried out for 1 hour to remove unreacted monomer. A polymer solution of 20–25% solids is obtained.

100 parts of this interpolymer-Duponol C composition are mixed with 10 parts of a water-dispersible, heat-reactive phenol-formaldehyde resin (65% solids).

EXAMPLE VI

Backsize VI was evaluated for release and tack results by test procedures 2 and B, respectively, with the following results:

|  | Room Temperature | 120 F. |
| --- | --- | --- |
| Adhesion to Backing _____ ounces__ | 0 | 0 |
| Tack _____ grams__ | 500 | 500 |

The test procedure used for evaluating the release agent in Backsizes VI to VIII and XIV is as follows:

RELEASE PROCEDURE 2

(1) Knife-coat the backsize being tested onto a 2 mil cellulose acetate film at a dry coating weight of approximately 0.04 oz./sq. yd. This coating is then cured at 300° F. for 1 minute.

(2) Apply the adhesive side of a 1 inch wide standard test tape to the backsized side of the cellulose acetate film. The standard test tape is composed of a saturated backing 1 which is coated with 2.35 oz./sq. yd. of adhesive J.

(3) Place 4 strips in Carver Laboratory press (without heat) and apply 2750 pounds pressure for 15 minutes. Since the platen is 6 inches square, with four strips of tape the pressure is 114 pounds per square inch.

(4) Condition overnight at 72° F., 50% relative humidity, herein referred to as room temperature test. Other samples are conditioned 24 hours at 120° F. and then cooled to room temperature for further testing. These samples are referred to as 120° F. tests.

(5) Attach free end of tape to spring balance mounted horizontally and having a maximum indicator.

(6) Holding the tape-backing assembly so that the tape is pulled off at a 180° angle, pull the backing from the tape as rapidly as possible without jerking.

(7) Record the maximum value indicated in ounces.

(8) Place the stripped tape lightly back on the same surface from which it was removed and save for tack tests.

The procedure for preparing the sample and measuring tackiness in Backsizes VI to VIII and XIV to XXII is as follows:

TACK PROCEDURE B (1) Cut sample of tape to be tested 6 inches long and ½ inch wide.

(2) Wrap tape around plastic ring with the adhesive mass side out and secure by overlapping the ends of the tape. Tape should fit snugly around the ring but should not be tight enough to distort the ring. Do not touch that portion of the mass which will come in contact with the pendulum.

(3) Secure the plastic ring to the end of the horizontal arm which actuates the spring balance.

(4) Clean the stainless steel contact surface on the pendulum with methyl ethyl ketone.

(5) Swing the pendulum to its highest position opposite the sample and secure it with the catch.

(6) Release the catch on the pendulum so that the pendulum swings down and up, contacting the tape on the ring. In swinging back, the pendulum will pull the ring and the horizontal arm and will thereby depress the spring balance an amount related to the tackiness of the tape.

(7) Record the maximum reading on the spring balance.

The machine for measuring tack is a pendulum-type instrument in which a pendulum, with a polished flat stainless steel surface at its outer extremity, swings approximately 145°, lightly contacting the adhesive surface of the tape which is wrapped, adhesive side out, around a ring made from 5 mil cellulose acetate. The acetate ring, which is 1¼ inches in diameter and ½ inch wide, is mounted near the free end of a horizontal arm pivoted at the same point as the pendulum and the free end rests on a spring balance which measures the vertical deflection of the horizontal arm. Therefore, as the pendulum starts to swing back after contacting the adhesive, it draws down the horizontal arm and deflects the spring balance an amount related to the tackiness of the tape.

*Backsize VII*

Parts by wet weight
Emulsion interpolymer of 63% ethyl acrylate, 35% acrylonitrile, 3% methacrylic acid emulsified with 4.5 parts of Duponol C (sodium lauryl sulfate)___ 100
Water - dispersible, heat reactive urea - formaldehyde resin (30% solids) _____ 3

This emulsion is prepared by using the procedure employed in making the emulsion for Backsize VI.

100 parts of this interpolymer-Duponol C composition are mixed with 3 parts of water dispersible, heat reactive urea-formaldehyde resin (30% solids).

EXAMPLE VII

Backsize VII was evaluated for release and tack results by test procedures 2 and B, respectively, with the following results:

|  | Room Temperature | 120 F. |
|---|---|---|
| Adhesion to Backing_____ounces__ | 0 | 0 |
| Tack_____grams__ | 320 | 300 |

*Backsize VIII*

Parts by wet weight
Emulsion interpolymer of 57% ethyl acrylate, 40% acrylonitrile, 3% methacrylic acid emulsified with 4.5 parts of Duponol C (sodium lauryl sulfate)___ 100
Water-dispersible, heat-reactive phenol-formaldehyde resin (65% solids) _____ 10

This emulsion is prepared by using the procedure employed in making the emulsion for Backsize VI.

100 parts of this interpolymer-Duponol C composition are mixed with 10 parts of water-dispersible, heat-reactive phenol-formaldehyde resin (65% solids).

EXAMPLE VIII

Backsize VIII was evaluated for release and tack results by test procedures 2 and B, respectively, with the following results:

|  | Room Temperature | 120 F. |
|---|---|---|
| Adhesion to Backing_____ounces__ | 0 | 0 |
| Tack_____grams__ | 500 | 500 |

*Backsize IX*

5% aqueous solution of Backsize I.

EXAMPLE IX

Backsize IX solution was coated on a cellulose acetate film at 0.02 oz./sq. yd. (dry weight) by conventional coating methods and cured at 300° F. for 30 seconds. Adhesive G was coated on the opposite side at 1.2 oz./sq. yd. (dry weight).

Backsize IX was evaluated for release and tack results by test procedures 1 and A, respectively, with the following results:

Adhesion to backing_____oz__ 12
Tack _____ .37

*Backsize X*

Parts by wet weight
"Resyn" emulsion 25-2203 (50% solids)_____ 100
Duponol C (sodium lauryl sulfate) (25% solids)___ 10
Water-dispersible, heat-reactive phenol-formaldehyde resin (65% solids) _____ 10

"Resyn" 25-2203 is believed to be an interpolymer of

67% polyvinyl acetate
30% ethyl acrylate
3% acrylic acid sold by National Starch Co.

100 parts of "Resyn" emulsion (50% solids) are mixed with 10 parts of Duponol C and 10 parts of a water-dispersible, heat-reactive phenol-formaldehyde resin (65% solids).

EXAMPLE X

Backsize X is coated on saturated backing 1 at 0.3 oz./sq. yd. (dry weight), and cured at 300° F. for 1 minute. Adhesive C is applied to the opposite side at 2.25 oz./sq. yd. (dry weight).

Release and tack results of this tape, made by test procedures 1 and A, respectively, are as follows:

Adhension to backing _____ oz.___ 6
Tack _____ .25

Backsize XI

Parts by wet weight
Carboxy-modified acrylonitrilebutadiene (42%
  solids) (Nitrex 2615) _____ 100
Duponol C (sodium lauryl sulfate (25% solids) ____ 10
"Kymene" 557 resin (vinyl phthalimide resin) (10%
  solids) _____ 4

The carboxy-modified acrylonitrile-butadiene is sold by Naugatuck Chemical Co., and is believed to be a polymer of an acrylic acid, acrylonitrile and butadiene.

The "Kymene" 557 resin is sold by Hercules Powder Co. and is believed to be vinyl phthalimide resin.

The above ingredients are mixed together until homogeneous.

EXAMPLE XI

Backsize XI is coated on saturated backing 1 at 0.3 oz./sq. yd. (dry weight), and cured at 300° F. for 1 minute. Adhesive G is coated on the opposite side at 2.25 oz./sq. yd. (dry weight).

Release and tack results of this tape, made by test procedures 1 and A, respectively, are as follows:

Adhesion to backing _____ oz.___ 7
Tack _____ .23

Backsize XII

Parts by wet weight
"Resyn" emulsion 25-2203 (50% solids) _____ 100
Duponol C (sodium lauryl sulfate) (25% solids)___ 10
Water-dispersible, heat-reactive phenol-formaldehyde
  resin (65% solids) _____ 10

The above ingredients are mixed together until homogeneous.

EXAMPLE XII

Backsize XII is coated on saturated backing 1 at 0.3 oz./sq. yd. (dry weight), and cured at 300° F. for 1 minute. Adhesive G is coated on the opposite side at 2.25 oz./sq. yd. (dry weight).

Release and tack results of this tape, made by test procedures 1 and A, respectively, are as follows:

Adhesion to backing _____ oz.___ 6
Tack _____ .25

Backsize XIII

Parts by wet weight
"Rhoplex" emulsion B-15 _____ 100
Duponol C (sodium lauryl sulfate) (25% solids)___ 10
Water-dispersible, heat-reactive phenol-formaldehyde
  resin (65% solids) _____ 10

"Rhoplex" emulsion B-15 is sold by Rohm and Haas Co., and is believed to be an interpolymer emulsion of 65% ethyl acrylate, 30% methyl methacrylate and 5% acrylic acid.

The above ingredients are mixed together until homogeneous.

EXAMPLE XIII

Backsize XIII is coated on saturated backing 1 at 0.3 oz./sq. yd. (dry weight), and cured at 300° F. for 1 minute. Adhesive G was coated on the opposite side at 2.25 oz./sq. yd. (dry weight).

Release and tack results of this tape, made by test procedures 1 and A, respectively, are as follows:

Adhesion to backing _____ oz.___ 9
Tack _____ .26

Backsize XIV

Parts by wet weight
Emulsion interpolymer (20% solids) of 60% ethyl
  acrylate, 35% acrylonitrile, 5% methacrylic acid
  emulsified with 4.5 parts of Dresinate 731 (sodium
  salt of disproportionated rosin acids) (sold by
  Hercules Powder Co.) _____ 100
Water-dispersible, heat-reactive phenol-formaldehyde
  resin (65% solids) _____ 5

This emulsion is prepared by using the procedure employed in making the emulsion for Backsize VI.

100 parts of this interpolymer-Dresinate composition are mixed with 5 parts of water-dispersible, heat-reactive phenol-formaldehyde resin (65% solids).

EXAMPLE XIV

Release and tack results of this backsize, made by test procedures 2 and A, respectively, are as follows:

|  | Room Temperature | 120 F. |
| --- | --- | --- |
| Adhesion to Backing _____ ounces__ | 32 | 28 |
| Tack _____ | 0.4 | 0.35 |

This backsize was used as a control to show that Dresinate 731 was not a suitable emulsifying agent for the purpose of this invention.

Backsize XV

Parts by wet weight
The emulsion of Backsize XIV _____ 100
Water-dispersible, heat-reactive phenol-formalde-
  hyde resin (65% solids) _____ 5
Igepon TC-42 (N-"coco aryl"-N-methyl taurine,
  sodium salt) (24.8% solids) (sold by Antara
  Chemical Division of General Aniline & Film
  Co.) _____ 4.0

This emulsion is prepared by using the procedure employed in making the emulsion for Backsize XIV.

EXAMPLE XV

The procedure of Example XIV is followed, except that Backsize XV is used instead of Backsize XIV.

Release and tack results of this backsize, made by test procedures 2 and A, respectively, are as follows:

|  | Room Temperature | 120 F. |
| --- | --- | --- |
| Adhesion to Backing _____ ounces__ | 0 | 0 |
| Tack _____ | 0.57 | 0.3 |

Backsize XVI

Parts by wet weight
The emulsion of Backsize XIV _____ 100
Water-dispersible, heat-reactive phenol-formalde-
  hyde resin (65% solids) _____ 5
Igepon AC-78 (coconut acid ester of sodium "ise-
  thionate," —$HOCH_2CH_2SO_3$—M) (85% solids)
  (sold by Antara Chemical) _____ 1.2

This emulsion is prepared by using the procedure employed in making the emulsion for Backsize XIV.

EXAMPLE XVI

The procedure of Example XIV is followed, except that Backsize XVI is used instead of Backsize XIV.

Release and tack results of this backsize, made by test procedures 2 and A, respectively, are as follows:

|  | Room Temperature | 120 F. |
|---|---|---|
| Adhesion to Backing_____ounces__ | 0 | 0 |
| Tack_____ | 0.33 | 0.28 |

*Backsize XVII*

Parts by wet weight
The emulsion of Backsize XIV_____ 100
Water-dispersible, heat-reactive phenol-formaldehyde resin (65% solids)_____ 5
Igepon T-43 (sodium N-methyl-N-oleoyl taurate) (33% solids) (sold by Antara Chemical)_____ 3.1

This emulsion is prepared by using the procedure employed in making the emulsion for Backsize XIV.

EXAMPLE XVII

The procedure of Example XIV is followed, except that Backsize XVII is used instead of Backsize XIV.

Release and tack results of this backsize, made by test procedures 2 and A, respectively, are as follows:

|  | Room Temperature | 120° F. |
|---|---|---|
| Adhesion to Backing_____ounces__ | 0 | 12 |
| Tack_____ | 0.36 | 0.44 |

*Backsize XVIII*

Parts by wet weight
The emulsion of Backsize XIV_____ 100
Water-dispersible, heat-reactive phenol-formaldehyde resin (65% solids)_____ 5
Ultrawet K (sodium dodecyl benzene sulfonate) (75% solids) (sold by Atlantic Chemical Co.)__ 1.3

This emulsion is prepared by using the procedure employed in making the emulsion for Backsize XIV.

EXAMPLE XVIII

The procedure of Example XIV is followed, except that Backsize XVIII is used instead of Backsize XIV.

Release and tack results of this backsize, made by test procedures 2 and A, respectively, are as follows:

|  | Room Temperature | 120° F. |
|---|---|---|
| Adhesion to Backing_____ounces__ | 0 | 0 |
| Tack_____ | 0.44 | 0.28 |

*Backsize XIX*

Parts by wet weight
The emulsion of Backsize XIV_____ 100
Water-dispersible, heat reactive phenol-formaldehyde resin (65% solids)_____ 5
Triton X-200 (octyl phenoxy diethylene-oxyethyl sulfonate, sodium salt) (16.3% solids) (sold by Rohm & Haas)_____ 6.1

This emulsion is prepared by using the procedure employed in making the emulsion for Backsize XIV.

Although the chain attached to the sulfonate radical in Triton X-200 is not strictly a straight chain hydrocarbon radical, it has a long term structure similar to a straight chain radical and has no polar substituents, hence it functions in the same manner, and in this application it should be considered an equivalent to the straight chain radical.

EXAMPLE XIX

The procedure of Example XIV is followed, except that Backsize XIX is used instead of Backsize XIV.

Release and tack results of this backsize, made by test procedures 2 and A, respectively, are as follows:

|  | Room Temperature | 120° F. |
|---|---|---|
| Adhesion to Backing_____ounces__ | 3 | 10 |
| Tack_____ | 0.66 | 0.33 |

*Backsize XX*

Parts by wet weight
The emulsion of Backsize XIV_____ 100
Water-dispersible, heat-reactive phenol-formaldehyde resin (65% solids)_____ 5
Sipon ES (lauryl ether of triethylene glycol sulfate, sodium salt) (26.5% solids) (sold by American Alcolac Corp.)_____ 3.7

This emulsion is prepared by using the procedure employed in making the emulsion for Backsize XIV.

EXAMPLE XX

The procedure of Example XIV is followed, except that Backsize XX is used instead of Backsize XIV.

Release and tack results of this backsize, made by test procedures 2 and A, respectively, are as follows:

|  | Room Temperature | 120° F. |
|---|---|---|
| Adhesion to Backing_____ounces__ | 0 | 0. |
| Tack_____ | 0.44 | 0.33 |

*Backsize XXI*

Parts by wet weight
The emulsion of Backsize XIV_____ 100
Water-dispersible, heat-reactive phenol-formaldehyde resin (65% solids)_____ 5
Aerosol 22 (tetra sodium N-(1,2 dicarboxyethyl)-N - octadecylsulfosuccinimate) (35% solids) (sold by American Cyanamid Co.)_____ 2.9

This emulsion is prepared by using the procedure employed in making the emulsion for Backsize XIV.

EXAMPLE XXI

The procedure of Example XIV is followed, except that Backsize XXI is used instead of Backsize XIV.

Release and tack results of this backsize, made by test procedures 2 and A, respectively, are as follows:

|  | Room Temperature | 120° F. |
|---|---|---|
| Adhesion to Backing_____ounces__ | 6 | 12 |
| Tack_____ | 0.57 | 0.4 |

*Backsize XXII*

Parts by wet weight
The emulsion of Backsize XIV_____ 100
Water-dispersible, heat-reactive phenol-formaldehyde resin (65% solids)_____ 5
Aerosol 18 (disodium N-octadecyl sulfosuccinimate) (35% solids) (sold by American Cyanamid Co.)_____ 2.9

This emulsion is prepared by using the procedure employed in making the emulsion for Backsize XIV.

EXAMPLE XXII

The procedure of Example XIV is followed, except that Backsize XXII is used instead of Backsize XIV.

Release and tack results of this backsize, made by test procedures 2 and A, respectively, are as follows:

|  | Room Temperature | 120° F. |
|---|---|---|
| Adhesion to Backing _____ ounces__ | 0 | 0 |
| Tack _____ | 0.4 | 0.3 |

Additional examples of suitable release backsizes, using different polymerizable carboxylic acid-containing monomers, are as follows:

*Backsize XXIII*

Parts by dry weight
Emulsion polymer of 80% butadiene, 20% methacrylic acid_____ 100
Durez 14798 (water-dispersible, heat-reactive phenol-formaldehyde resin) (62% solids) (sold by Durez Chemical Co., a subsidiary of Hooker Chemical Co.) _____ 10
Duponol C_____ 10

This backsize and Backsizes XXIV–XXVI may be prepared and used as described in the previous examples, in the making of release coatings and pressure-sensitive adhesive tapes, with comparable results.

*Backsize XXIV*

Parts by dry weight
Emulsion polymer of 90% methyl acrylate and 10% acrylic acid_____ 100
Durez 14798_____ 7
Aerosol 18 (disodium N-octadecyl sulfosuccinimate) (35% solids)_____ 5

*Backsize XXV*

Parts by dry weight
Emulsion polymer of 95% vinyl acetate, 5% maleic anhydride _____ 100
Durez 14798_____ 15
Igepon T–43 (sodium N-methyl-N-oleoyl taurate) (33% solids)_____ 7

*Backsize XXVI*

Parts by dry weight
Emulsion interpolymer of 70% butadiene, 25% acrylonitrile, 5% itaconic acid_____ 100
Durez 14798_____ 10
Duponol C_____ 5

Although the film-forming polymer has been referred to broadly herein as "an oil-resistant, film-forming polymer," in its preferred form it is an *aliphatic hydrocarbon polymer.*

The "Cypel" and other coatings of this invention are applied by any of the standard coating techniques, as by knife coating, roller-coating, or print coating, after which the sheet is passed through a drying oven to remove solvent.

The thickness of the release coating may vary, but it is very thin, being in the neighborhood of about .01–0.5 mil.

The normally tacky and pressure-sensitive adhesive may be any of those used in the art, examples being compositions containing an elastomeric component which is usually a natural or synthetic rubber, or similar elastomeric polymer, and a resinous component compatible with the binder and adapted to impart tack to the adhesive composition, together with suitable amounts of various types of additives, such as conventional fillers, anti-oxidants, etc.

It is believed that the new and useful results of this invention are due in large part to the use of a polymer made from a mixture containing a polymerizable unsaturated monomer, i.e., a carboxylic acid. Although I have given examples of several release coatings containing polymers made from several different types of carboxylic acids (acrylic acid, methacrylic acid, ethacrylic acid, maleic acid and itaconic acid), many other carboxylic acids having a double bond $\alpha, \beta$ to the carboxylic group (such as fumaric acid, aconitic acid, chloromalic acid, citraconic anhydride, or N-carbamyl maleimide, and the corresponding acids and anhydrides) can be used in a similar way with similar results, in amounts of from 1 to 25% (and preferably 2 to 10%), of the oil-resistant, film-forming polymer.

The water-dispersible, heat-reactive aldehyde of imide resin may be present in an amount from 0.9 to 25% of the dry weight (and preferably 5 to 15%) of the backsize.

It will therefore be apparent that the release backsize coatings of this invention will anchor well to the customary base materials, will have satisfactory ink adherence, and will have easy release properties which are retained even though subjected to elevated temperatures. Furthermore, they do not impair the tackiness of the pressure-sensitive adhesive coating.

Although I have hereinbefore referred to pressure-sensitive adhesive tapes, it will be understood that this invention is not limited to tapes, but may be applied to labels or any materials having a layer of pressure-sensitive adhesive in contact with the release side of an interliner, or my release coating may be applied to both sides of a liner adapted to be inserted between adjacent layers of pressure-sensitive adhesive tape or other material that has been coated with adhesive on both sides.

In the accompanying drawing, the FIGURE is a fragmental perspective view of a tape embodying the present invention. In this figure 11 is a backing, 12 is a pressure-sensitive adhesive applied to one side of the backing, and 13 is an aqueous mixture of an aldehyde or imide resin, a sulfated or sulfonated wetting agent containing an 11–21 carbon atom aliphatic straight chain, and a polymeric reaction product of monoene or diene monomer and a monomeric polymerizable carboxylic acid with a double bond $\alpha, \beta$ to the carboxylic group.

It is apparent that many widely different embodiments of this invention may be made without departing from the spirit and scope thereof; and, therefore, it is not intended to be limited except as indicated in the appended claims.

I claim:

1. A pressure-sensitive adhesive tape containing a flexible backing which has a pressure-sensitive adhesive on one side, and on the opposite side a thin release coating comprising a film-former consisting essentially of
   (1) a water-dispersible, heat-reactive resin of the group consisting of aldehyde and imide resins;
   (2) an emulsifying agent consisting essentially of a sulfated or sulfonated wetting agent containing at least one aliphatic straight chain of 11–21 carbon atoms; and
   (3) an oil resistant, film-forming interpolymer derived from a polymeric reaction product of a member of the group consisting of monoene monomers, diene monomers, and mixtures of these, and a monomeric polymerizable carboxylic acid with a double bond to the carboxylic group, said monomeric polymerizable carboxylic acid being present in an amount of from 1 to 25% of said film-forming interpolymer;

said water-dispersible, heat-reactive resin being present in the mixture in from about 1 to 33 parts by weight based on 99 parts by weight of said film-forming interpolymer.

2. The pressure-sensitive adhesive tape of claim 1, in which the components of the interpolymer are ethyl acrylate, acrylonitrile and an acrylic acid.

3. The pressure-sensitive adhesive tape of claim 1, in which the interpolymer of the release coating is ethyl acrylate, acrylonitrile and an acrylic acid present in the proportions of about 60, 35 and 5, respectively.

4. The pressure-sensitive adhesive tape of claim 1, in which the emulsifying agent is sodium lauryl sulfate.

5. The pressure-sensitive adhesive tape of claim 1, in which the aldehyde is a water-dispersible, heat-reactive phenol-formaldehyde.

6. The pressure-sensitive adhesive tape of claim 1, in which the aldehyde is a water-dispersible, heat-reactive urea-formaldehyde.

7. The pressure-sensitive adhesive tape of claim 1, in which the aldehyde is a water-dispersible, heat-reactive melamine-formaldehyde.

8. The pressure-sensitive adhesive tape of claim 1, in which the carboxylic acid is methacrylic acid.

9. The pressure-sensitive adhesive tape of claim 1, in which the components of the interpolymer are butadiene, acrylonitrile and acrylic acid.

References Cited in the file of this patent

UNITED STATES PATENTS

| | | |
|---|---|---|
| 2,548,980 | Kellgren | Apr. 17, 1951 |
| 2,607,711 | Hendricks | Aug. 19, 1952 |
| 2,725,981 | Abere et al. | Dec. 6, 1955 |
| 2,787,603 | Sanders | Apr. 2, 1957 |
| 2,791,519 | Gerke et al. | May 7, 1957 |
| 2,923,646 | Jordan | Feb. 2, 1960 |